May 7, 1929. E. M. ATKINSON 1,711,916
DETACHABLE BRACE FOR ROTATING IMPLEMENT HANDLES
Filed Sept. 19, 1927
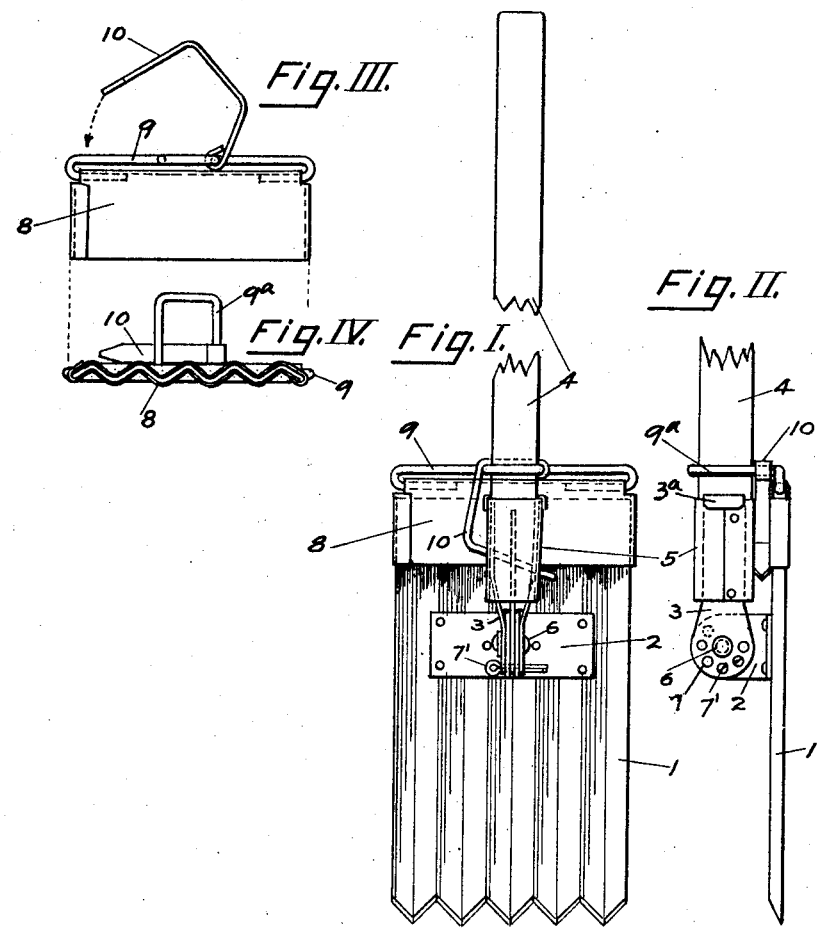
EDWARD M. ATKINSON.
Inventor.
Mason, Fenwick & Lawrence
Attorney.

Patented May 7, 1929.

1,711,916

UNITED STATES PATENT OFFICE.

EDWARD M. ATKINSON, OF VANCOUVER, WASHINGTON.

DETACHABLE BRACE FOR ROTATING IMPLEMENT HANDLES.

Application filed September 19, 1927. Serial No. 220,549.

This invention relates to braces for implement handles, and particularly to handles attached to implement blades in a rotatable manner.

An object of the invention is to provide simple and inexpensive means for holding rigidly, in a predetermined position, the blade of a garden implement which may be attached rotatably to a handle for manual use.

Another object is to provide a clamp for extending over the top end of a blade for a garden implement, to form a foot rest for forcing the blade into the earth, with means for attaching the clamp to the handle of the implement and for bracing the handle and clamp to hold the parts rigid in the desired position.

A further object is to provide adjustable means for use in connection with the implement described in and covered by Letters Patent issued to this applicant from the United States, No. 1,203,959, whereby the implement so described may be used for a hoe, or for a spade, and the relative positions of the blade and the handle thereof, shall be held rigidly in the desired positions, and the holding means so constructed and arranged that they will not become loosened in use, but may be easily and quickly changed and rearranged to provide a suitable hoe or spade for the purposes desired.

In garden work, where weeds have been allowed to grow to large size, the ordinary hoe is an ineffective tool for removing them, as the hoes are too light, and being made with a flat blade edge, become dulled by contact with stones and gravel, and in gardening it frequently becomes necessary to use a light spade in connection with a hoe, and the implement as covered by said patent, and as improved by the use of the braces and clamp, forms an implement that is very effective in removing all weeds and useless vegetation, does not become clogged with the uprooted weeds, is easily kept sharp, not easily dulled, because of its teeth with sloping edges, and the rigidity provided by the attachments now shown, could not be obtained by the simple pivot attachment and auxiliary pin as before shown in the Letters Patent, I have illustrated my invention by the accompanying drawings, of which—

Figure 1 is a front elevation of the implement held in form for a spade with the clamp across the top of the blade.

Figure 2 is a side elevation of the same form of implement showing the clamp held to the handle by a wire attached to the clamp.

Figure 3 is a detailed view of the clamp and wires for connection with the handle and blade.

Figure 4 is a detailed top view of the parts shown in Figure 3.

Like numerals on the different figures represent like parts.

Numeral 1 designates the implement blade formed of corrugated metal with sharpened teeth at its bottom, 2 is one of a pair of flat perforated pieces of metal riveted to the blade, and 3 is a perforated metal lug extending from the handle 4 and ferrule 5, and held between the parts 2 by a pivot pin 6. The end of the handle entering the ferrule is preferably squared and the ferrule is also squared for holding braces and clamps. Numeral 7 illustrates a series of perforations through the parts 2 and 3, through which an adjustable cotter pin 7' may be inserted for holding the blade and handle in desired position.

In order to insure the positions remaining without change after the pin has been inserted, and to make the implement rigid, the other braces and clamps are affixed and adjusted as follows.

Numeral 8 is a metal clamp bent in form to fit snugly over the top of the blade and forms a support for the foot, and 9 is bent round wire with its ends turned under and held between the top folds of the clamp 8, and has a squared offset 9ª of suitable size to fit around the handle 4, and on one side of the squared portion is rotatably held a flat wire 10 bent in form of an open hook with a pointed end, for use in holding the clamp and handle rigidly with each other, when the hook is forced in between the clamp and handle ferrule to take up all slack between the parts.

Having described my invention, I claim as new:

A garden implement having a blade and rotary handle, a metal clamp folded over the top of the blade in order to embrace both sides thereof, a bent wire member mounted in the clamp and having its ends held between the folds thereof, an offset extending from the bent wire member and adapted for receiving the handle, a rotatably mounted element on the offset adapted to hold the clamp and handle in rigid relationship with each other.

In testimony whereof I affix my signature.

EDWARD M. ATKINSON.